(12) United States Patent
Mann et al.

(10) Patent No.: US 10,875,138 B1
(45) Date of Patent: Dec. 29, 2020

(54) TOOL HOLDER ASSEMBLY FOR MACHINING SYSTEM

(71) Applicant: M4 Sciences, LLC, West Lafayette, IN (US)

(72) Inventors: James B. Mann, West Lafayette, IN (US); Yang Guo, Whitestown, IN (US); Seong Eyl Lee, West Lafayette, IN (US)

(73) Assignee: M4 Sciences LLC, West Lafayette, IN (US)

( * ) Notice: Subject to any disclaimer, the term of this patent is extended or adjusted under 35 U.S.C. 154(b) by 16 days.

(21) Appl. No.: 15/673,314

(22) Filed: Aug. 9, 2017

Related U.S. Application Data

(60) Provisional application No. 62/372,659, filed on Aug. 9, 2016, provisional application No. 62/372,371, filed on Aug. 9, 2016.

(51) Int. Cl.
*B23Q 15/007* (2006.01)
*B23Q 11/10* (2006.01)

(52) U.S. Cl.
CPC ........ *B23Q 15/007* (2013.01); *B23Q 11/1023* (2013.01)

(58) Field of Classification Search
CPC ......... B23B 37/00; B23B 31/00; B23B 31/26; B23C 1/00; B23C 5/26; Y10T 408/16; Y10T 408/165; Y10T 408/17; Y10T 408/172; Y10T 408/173; Y10T 408/21; Y10T 409/304648; Y10T 409/304704; Y10T 409/306832; Y10T 409/306888; Y10T 409/306944; Y10T 409/307224; Y10T 409/30728; Y10T 409/307336; Y10T 409/3084; Y10T 409/309352;
(Continued)

(56) References Cited

U.S. PATENT DOCUMENTS 24,543,136 9/1948 Karweit
2,452,211 A 10/1948 Rosenthal
(Continued)

FOREIGN PATENT DOCUMENTS

DE 2436340 3/1975
DE 9212079 1/1993
(Continued)

OTHER PUBLICATIONS

J.Pi and X.P. Xu; Design of Integration Tool-Holder System for Ultrasonic Vibration Machhining Using Contactless Inductive Poewr Transfer, May 5, 2005 at www.scientific.net., Switzerland.

*Primary Examiner* — Nicole N Ramos
(74) *Attorney, Agent, or Firm* — Indiano Law Group LLC; E. Victor Indiano; John T. Woods, III

(57) ABSTRACT

A tool holder is provided for holding one of a tool and workpiece. The tool holder is configured for mounting to a driving member of a machining device. The tool holder includes a tool holder first end including a coupler for coupling the tool holder to the driving member of the machining device. A tool holder second end includes a clamp for releasably holding one of the tool and workpiece. A force sensor is disposed between the clamp and the coupler for sensing force exerted on the one of the tool and workpiece held by the clamp. A linear actuator is disposed between the clamp and the force sensor for linearly moving the one of the tool and workpiece.

13 Claims, 4 Drawing Sheets

(58) Field of Classification Search
CPC .. Y10T 409/309408; Y10T 409/30952; B23Q 17/00
See application file for complete search history.

(56) References Cited

U.S. PATENT DOCUMENTS

| | | | |
|---|---|---|---|
| 2,514,759 A | 7/1950 | Hallden | |
| 2,515,539 A | 7/1950 | Wichman | |
| 2,521,900 A | 9/1950 | Clark | |
| 2,712,254 A * | 7/1955 | Schodeberg | B25B 21/007 173/93.6 |
| 3,003,372 A | 10/1961 | Findley | |
| 3,015,914 A | 1/1962 | Roney | |
| 3,028,771 A | 4/1962 | Bunnell | |
| 3,056,320 A | 10/1962 | Findley | |
| 3,105,482 A | 10/1963 | Mieville | |
| 3,303,522 A | 2/1967 | Kumabe | |
| 3,471,724 A | 10/1969 | Balamuth | |
| 3,503,416 A | 4/1970 | Sundberg | |
| 3,513,309 A | 5/1970 | Hehemann | |
| 3,559,259 A | 2/1971 | Kumabe | |
| 3,561,462 A | 2/1971 | Jugler | |
| 3,614,484 A | 11/1971 | Shoh | |
| 3,619,671 A | 11/1971 | Shoh | |
| 3,713,045 A | 1/1973 | Usuda et al. | |
| 3,754,487 A | 8/1973 | Nachtigal | |
| 3,837,121 A | 9/1974 | Schirmer | |
| 4,052,132 A | 10/1977 | Oates | |
| 4,098,354 A * | 7/1978 | Alcenius | B25B 21/007 173/93.5 |
| 4,104,900 A | 8/1978 | Nels | |
| 4,261,675 A | 4/1981 | Zanki | |
| 4,416,570 A * | 11/1983 | Argenbright | B23Q 1/48 269/296 |
| 4,559,600 A | 12/1985 | Rao | |
| 4,640,156 A | 2/1987 | Nakagawa et al. | |
| 4,646,595 A | 3/1987 | Slee | |
| 4,653,235 A | 3/1987 | Farmer | |
| 4,657,412 A * | 4/1987 | McLarty | B23Q 1/265 384/1 |
| 4,667,546 A | 5/1987 | Dombrowski et al. | |
| 4,852,434 A * | 8/1989 | Bald | B23B 23/00 82/118 |
| 4,911,044 A | 3/1990 | Mishiro et al. | |
| 4,940,410 A * | 7/1990 | Apap | A61C 1/07 433/102 |
| 5,021,941 A | 6/1991 | Ford et al. | |
| 5,113,728 A | 5/1992 | Medeksza | |
| 5,140,773 A | 8/1992 | Miwa | |
| 5,144,771 A | 9/1992 | Miwa | |
| 5,170,103 A * | 12/1992 | Rouch | B23B 29/022 318/128 |
| 5,291,812 A | 3/1994 | Yen et al. | |
| 5,331,870 A | 7/1994 | Chin-Long | |
| 5,336,024 A * | 8/1994 | Nakagawa | B23B 35/00 408/1 R |
| 5,342,152 A | 8/1994 | Medeksza | |
| 5,361,543 A | 11/1994 | Bory | |
| 5,372,568 A * | 12/1994 | Matsuoka | B23B 31/263 483/56 |
| 5,558,477 A | 9/1996 | Browning et al. | |
| 5,778,745 A | 7/1998 | Furusawa et al. | |
| 5,810,528 A * | 9/1998 | O'Connor | B23B 29/022 408/143 |
| 5,857,814 A | 1/1999 | Jang | |
| 5,906,460 A * | 5/1999 | Link | B23Q 17/09 356/602 |
| 5,911,802 A | 6/1999 | Kimura et al. | |
| 5,939,146 A | 8/1999 | Lavernia | |
| 5,957,016 A | 9/1999 | Segalman et al. | |
| 6,084,363 A | 7/2000 | Mizumoto | |
| 6,122,999 A | 9/2000 | Durazo et al. | |
| 6,202,521 B1 | 3/2001 | Rossetti et al. | |
| 6,234,728 B1 | 5/2001 | Brun-Picard | |
| 6,241,435 B1 * | 6/2001 | Huang | B23Q 5/225 318/575 |
| 6,341,553 B1 * | 1/2002 | Rohm | B23B 31/1622 279/4.02 |
| 6,465,931 B2 | 10/2002 | Knowles et al. | |
| 6,470,225 B1 | 10/2002 | Yutkowitz | |
| 6,550,546 B2 * | 4/2003 | Thurler | B25D 16/00 173/109 |
| 6,555,868 B2 | 4/2003 | Shimizu et al. | |
| 6,599,178 B1 | 7/2003 | Gluche et al. | |
| 6,706,324 B2 | 3/2004 | Chandrasekar et al. | |
| 6,718,178 B1 | 4/2004 | Bedi et al. | |
| 6,718,854 B2 | 4/2004 | Bedi et al. | |
| 6,762,535 B2 | 7/2004 | Take | |
| 6,925,915 B1 | 8/2005 | Claesson et al. | |
| 7,131,797 B2 | 11/2006 | Kai et al. | |
| 7,175,506 B2 | 2/2007 | Fiebelkorn | |
| 7,216,571 B2 | 5/2007 | Schreiber et al. | |
| 7,547,169 B1 * | 6/2009 | Zagar | B23B 31/263 33/639 |
| 7,587,965 B2 | 8/2009 | Mann | |
| 7,628,099 B2 | 12/2009 | Mann et al. | |
| 7,816,840 B2 | 10/2010 | Tang | |
| 7,824,247 B1 | 11/2010 | Bar-Cohen | |
| 8,297,893 B2 * | 10/2012 | Hangleiter | B23B 31/265 279/134 |
| 8,694,133 B2 | 4/2014 | Mann et al. | |
| 8,870,500 B2 | 10/2014 | Short | |
| 8,905,689 B2 | 12/2014 | Short | |
| 10,603,723 B1 * | 3/2020 | Mann | B23B 37/00 |
| 2002/0150496 A1 | 10/2002 | Chandrasekar et al. | |
| 2003/0001456 A1 | 1/2003 | Kauf et al. | |
| 2003/0085632 A1 | 5/2003 | Take | |
| 2005/0039513 A1 | 2/2005 | Fabris | |
| 2005/0167008 A1 | 8/2005 | Chandrasekar et al. | |
| 2006/0099039 A1 | 5/2006 | Maki et al. | |
| 2006/0120819 A1 * | 6/2006 | Honegger | B23B 41/14 409/235 |
| 2006/0128283 A1 | 6/2006 | Fiebelkorn | |
| 2006/0243107 A1 | 11/2006 | Mann et al. | |
| 2006/0248980 A1 | 11/2006 | Mann et al. | |
| 2006/0251480 A1 | 11/2006 | Mann | |
| 2007/0066188 A1 | 3/2007 | Nitta et al. | |
| 2008/0041604 A1 | 2/2008 | Sauer | |
| 2008/0238255 A1 | 10/2008 | Lee et al. | |
| 2009/0079357 A1 | 3/2009 | Shteynberg et al. | |
| 2009/0146530 A1 | 6/2009 | Tang et al. | |
| 2009/0234490 A1 * | 9/2009 | Suprock | B23B 31/02 700/159 |
| 2010/0158307 A1 | 6/2010 | Kubota | |
| 2011/0066277 A1 | 3/2011 | Mann et al. | |
| 2011/0147086 A1 * | 6/2011 | Hummes | E21B 23/00 175/57 |
| 2011/0155407 A1 | 6/2011 | Yang | |
| 2011/0222975 A1 | 8/2011 | Short | |
| 2011/0230868 A1 * | 9/2011 | Isobe | A61B 17/1626 606/1 |
| 2012/0090409 A1 * | 4/2012 | Luthje | G01L 1/18 73/862.627 |
| 2012/0107062 A1 | 5/2012 | Moraru | |
| 2012/0230781 A1 | 9/2012 | Hoffer | |
| 2013/0028675 A1 | 1/2013 | Vogler et al. | |
| 2014/0216216 A1 | 8/2014 | Hessenkamper | |
| 2014/0241821 A1 | 8/2014 | Mann et al. | |

FOREIGN PATENT DOCUMENTS

| | | | | |
|---|---|---|---|---|
| DE | 10343682 | 4/2005 | | |
| EP | EP 0901895 A1 | 2/1998 | | |
| EP | 1669148 A1 | 6/2006 | | |
| JP | 1982-56-45336 | 4/1981 | | |
| JP | 61030310 A * | 2/1986 | | B23Q 15/12 |
| JP | 19957-164217 | 6/1995 | | |
| JP | 2002126902 | 5/2002 | | |
| JP | 2002346817 | 12/2002 | | |
| JP | 2006228831 | 8/2006 | | |
| JP | 2009214286 | 9/2009 | | |
| JP | 2009241226 | 10/2009 | | |

(56) References Cited

FOREIGN PATENT DOCUMENTS

| | | |
|---|---|---|
| JP | 2011131343 | 7/2011 |
| KR | 20120117156 | 10/2012 |
| WO | WO2003061886 | 1/2003 |
| WO | WO2006002675 | 1/2006 |
| WO | WO2011029079 | 3/2011 |

* cited by examiner

TOOL HOLDER ASSEMBLY FOR MACHINING SYSTEM

PRIORITY STATEMENT

This non-provisional patent application claims benefit of priority to James B. Mann. U.S. Provisional Patent Application Nos. 62/372,659 filed 9 Aug. 2016 for a Tool Holder Actuator and Real-Time Fore Monitoring for Machining Process Control; and James B. Mann U.S. Provisional Patent No. 62/372,371 filed 9 Aug. 2016 for a Forced Air Cooling Apparatus For Modulation Assisted Machining both of which are fully incorporated herein by reference.

I. TECHNICAL FIELD OF THE INVENTION

The present invention relates to tool holder assemblies, and more particularly to a tool holder assembly that is capable of moving a tool or work piece, as appropriate, in both a linear and rotational manner simultaneously.

II. BACKGROUND OF THE INVENTION

The term machining refers to any one of a variety of processes in which an un-formed, or less than fully formed item (a "workpiece") is cut into a desired shape and size by a controlled material removal process. In a typical machining process, one employs a machine that includes a driver that typically induces a rotary motion or a linear motion to a tool. The tool then engages the workpiece upon which the machining operation is to be performed. The engagement of the tool with the workpiece causes material to be removed from the workpiece, and in the process, changes the form or shape, and/or size of the workpiece.

In most cases, a rotary electric motor is coupled to a tool that is held in a tool holder to move the tool in a rotary manner so that sharp edges formed on the tool, can cut into and through, the material of the workpiece.

The tool holder is interposed between the driving motor and the cutting tool to couple the cutting tool to the driving motor. Typically, a tool holder has a first end that is coupled to the electric rotator, that may comprise an electric motor (or a shaft of some sort), and a second end which holds the tool itself. The second end of the tool holder is usually designed to removably receive the cutting tool so that cutting tools can be conveniently coupled to and removed from the holder to facilitate tool replacement.

The most common type of machining is a milling operation wherein a machining device is used to rotate a cutting tool to cause the cutting edges of the tool to bear against a workpiece. Additionally, drilling operations are another type of machining operation in which holes are produced or refined by bringing a rotating cutter with cutting edges at its lower extremity into contact with the workpiece.

A different type of machining operation is a turning operation. A turning operation differs from a milling operation. A turning operation normally involves the workpiece being rotated rather than the cutting tool being rotated.

In earlier James Mann et al applications that are also assigned and/or licensed to the assignee of the instant invention, tool holders and assemblies and methods of modulation were disclosed that incorporated a linear, back-and-forth type oscillating movement into an otherwise rotary machining operation, so that the workpiece would not only rotate with respect to the cutting tool, but would move in a linear fashion with regard to the cutting tool. In this regard, the reader's attention is directed to James B. Mann et al., U.S. Pat. Nos. 7,587,965; 7,628,099; 7,895,872; 7,617,750; and 8,694,133, all of which are fully incorporated herein by reference.

The above patents disclose that modulation tool holder assemblies and methods of modulation involving a combination of linear and rotational movement of a workpiece can improve machining performance and/or create machine chip particles with controlled size and shape. The systems described in the above-referenced patents help to demonstrate the modulated cutting velocity or undeformed chip thickness can benefit the machining operations.

The devices described above disclose the use of a stationary system for modulation that involve the rotation of the workpiece. These systems have demonstrated remarkable success in the ease of installation for processes where undeformed chip thickness is modular. The process relies on a linear oscillation motion that is super imposed on a non-rotating system. Another publication of interest is James B. Mann et al., U.S. Published Patent Application No. 2014/0241821 that discloses a tool holder that is capable of modulated movement in a rotating spindle. This '821 application, along with the above referenced Mann patents and publications are incorporated fully by reference into this instant application.

Although the device described in the '821 Published Application performs its function in a workmanlike manner, room for improvement exists. In particular, the device shown in the '821 application is somewhat complicated to install into an existing machine, and may require a range of modifications to the machine tool.

An improvement over the device shown in the '821 application is shown in a recently filed James B. Mann et al., U.S. Patent Application, which is also fully incorporated herein. This patent application discloses an improved tool holder/spindle for a machining system that is capable of both rotary movement and modulated axial movement.

The above described device does provide some difficulties, when used on systems that rely on automated systems for tool changing, because the linear actuator or electrical power occurs across a rotating system.

One object of the present invention is to provide a device that improves over the devices described above.

In one aspect of the present invention, an improvement is achieved by providing an improved cooling system for a tool holder assembly.

In another aspect of the present invention, improvement is achieved by providing force monitoring capabilities for the system.

III. SUMMARY OF THE INVENTION

In accordance with the first aspect of the present invention, a tool holder is provided for holding one of a tool and workpiece. The tool holder is configured for mounting to a driving member of a machining device. The tool holder comprises a tool holder first end including a coupler for coupling the tool holder to the driving member of the machining device. A tool holder second end includes a clamp for releasably holding one of the tool and workpiece. A force sensor is disposed between the clamp and the coupler for sensing force exerted on the one of the tool and workpiece held by the clamp. A linear actuator is disposed between the clamp and the force sensor for linearly moving the one of the tool and workpiece.

Preferably, the clamp holds the tool for permitting the tool to perform a machining operation on the workpiece. Additionally, the linear actuator is preferably configured for moving the tool into and out of engagement with the workpiece, so that the linear actuator imposes a superimposed sinusoidal modulation on the cutting tool for moving the cutting tool relative the workpiece and to cause instantaneous and periodic engagement and separation between the cutting tool and the work piece.

A controller is preferably in communication with the linear actuator for providing a controllable driving voltage for driving the linear actuator. The controller is also in communication with the force sensor for receiving the force signal generated by the force sensor.

In a most preferred embodiment, the force signal provides real time force information to the controller for enabling the controller to adjust the driving voltage to the linear actuator in response to the received force information.

The controller may include both the tool holder controller and a machine controller, that is capable of controlling machine processed parameters, such as feed, velocity and spindle speed. The machine controller is configured for processing the force signal received from the force sensor, to adjust the machine processing parameter in response to the force signal received.

In another preferred embodiment, the sensor comprises a piezo-resistive strain gauge, and a biasing member is provided for engaging a clamp member, to bias the clamp to move in an axial direction, opposite to the axial direction in which the linear actuator is configured to axially move the clamp member.

In another aspect of the present invention, a tool holder assembly is provided for holding one of a tool and a workpiece. The tool holder assembly is configured for mounting to a driving member of a machine device. A tool holder assembly includes a first end to which the tool holder can be coupled to the machine device, and a second end to which the tool assembly can be coupled to the one of the tool and workpiece. The tool holder assembly comprises a rotating spindle member and a coolant housing. The coolant housing has a coolant inlet for receiving liquid coolant. An air housing has an air housing inlet for receiving air from an air source. A linear actuator is provided that has a first end and a second end. A linear actuator holder is provided for holding the first end of the linear actuator. A tool holder holds the one of the tool and the workpiece and is disposed adjacent to the second end of the tool holder assembly. A bearing shaft member is disposed between the second end and of the linear actuator and the tool holder.

The tool holder assembly also includes a coolant passageway for conducting coolant within the tool holder assembly from the coolant inlet, past the linear actuator, the bearing shaft member and the tool holder to deliver coolant to one of the tool and workpiece. The tool holder assembly further includes an air passageway for conducting air within the tool holder assembly from the air housing inlet, and past the linear actuator holder, the linear actuator and the bearing shaft member to an exhaust port. The exhaust port is in fluid communication with the air passageway for exhausting air therein to a space exterior of the tool assembly.

In a preferred embodiment of the present invention, the tool holder assembly includes a tubular member that is disposed between the air housing and the linear actuator holder. The tubular member includes an interior passageway for conducting air between the air housing and the linear actuator holder. Additionally, an electrical coupling can be coupled to the tubular member, and an electrical conductor can be carried by the tubular member from the electrical coupling to the linear actuator holder.

Most preferably, the electrical line is disposed within the tubular member and conducts electrical energy and electrical signals, such as control signals to the linear actuator for actuating the linear actuator.

These and other features and advantages of the present invention will be disclosed to one skilled in the art upon a review and the drawings, description and claims set forth below.

V. DETAILED DESCRIPTION OF THE DRAWINGS

A. Introduction

Figure 1:
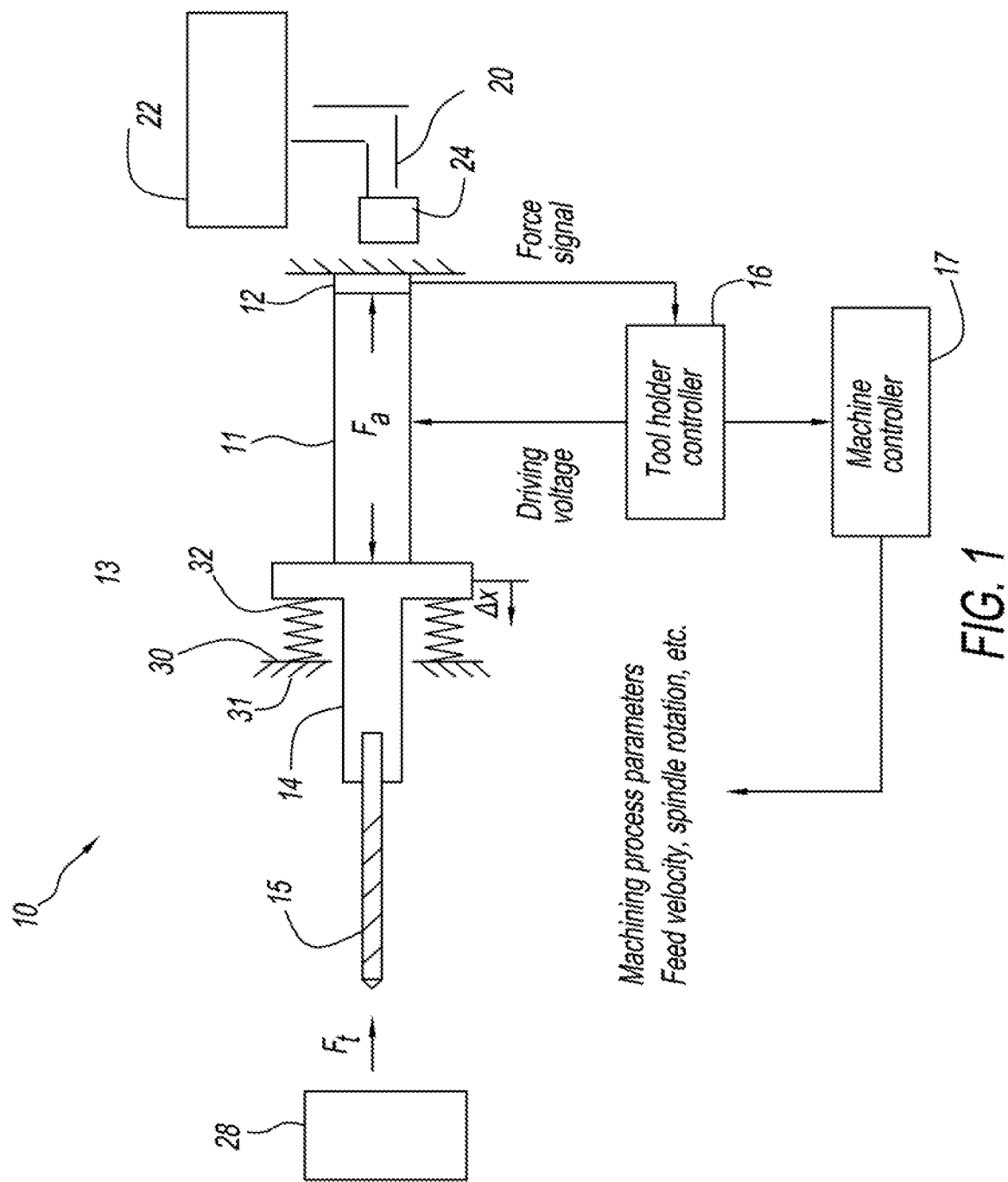
FIG. 1 is a schematic view of a tool holder of the present invention illustrating the presence of a force sensor.

The description that follows describes, illustrates and exemplifies one or mom particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles.

The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing reference numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Furthermore, certain views are side or sectional views which depict only one side of the device (or one set of components of a multi set array of components). However, it will be understood that the opposite side and other component sets are preferably identical thereto. The present specification is intended to be taken as a whole and interpreted in accordance with the principles of the present invention as taught herein and understood by one of ordinary skill in the art.

B. Modulation of the Movement of the Cutting Tool.

The tool holder of the present invention is especially adaptable for use in connection with tooling systems wherein the machining is augmented and assisted by the linear movement of the tool into and out of engagement with the workpiece. This modulation assisted machine processing involves the introduction of the sinusoidal motion of the tool into the physics of mechanical drilling.

Driven by an electrical signal to a piezo-electrical actuator, the sinusoidal motion moves the tool member in a manner that causes the tool to engage with and be disengaged from the work piece up to 1,000 times per second. This sinusoidal motion of the tool member causes the formation of small metal chips while simultaneously allowing machining coolant to penetrate the area.

The metal chips are used to prevent binding and drill breakage, while improved lubrication reduces friction and temperature. As will be appreciated, issues relating to friction and temperature build up are two of the most invasive rate limiting factors in mechanical drilling.

A further explanation of the theory, practice and physics behind sinusoidal movement of a tool member, is discussed in more detail in the applicants' other patents and patent applications discussed above, including U.S. Pat. Nos. 7,587,965, 8,694,133, 7,895,872, 9,527,134, and 7,628,099, the disclosures of which are all fully incorporated herein by reference.

C. Real Time Force Monitoring Aspect of the Present Invention

Turning now to FIG. 1, a tool holder 10 is shown schematically. The tool holder 10 is provided for holding one of a tool 15 and workpiece 28. In FIG. 1, the tool holder 10 is shown holding the tool 15 that is designed for engaging the work piece 28, to perform a machining operation on the workpiece 28. Although a variety of machining operations can be performed on the workpiece 28, the illustrations below will assume that tool 15 is a drill, that is performing a drilling operation on a workpiece 28 to drill a hole within the workpiece 28. The present invention is especially useful in connection with drilling deep holes, because the modulated engagement and disengagement of the tool 15 with the workpiece 28 helps to reduce frictional engagement, and heating of the workpiece, along with providing a vehicle for removing machined scrap and chips from the interior of the hole to be drilled.

The tool holder 10 is configured for being mounted to the driving member 20, such as an output shaft of a machining device 22, both of which are shown schematically, Exemplary machining devices 22 and their output shafts and driving devices 20 are shown in the other James B Mann patents that are listed above in the instant application.

The tool holder 10 includes a first end 23, also known as the machine end. The tool holder first end 23 is disposed closest to the machine 22 driving member 20 and includes a coupler 24 for coupling the tool holder 10 to the driving member 20 of the machining device 22.

The tool holder 10 also includes a tool holder second end 26. Tool holder second end 26 includes a clamp 14, that is sometimes referred to as a nose piece. The clamp 14 is provided for releasably but tightly holding one of the tool 15 and workpiece 28. In the drawings, clamp 14 is shown as holding the tool 15, so that the tool can perform an operation on the workpiece 28.

A force sensor that is preferably a piezo-resistive strain gauge 12 is disposed between the clamp 14 and the coupler 24 for sensing the force exerted on the tool 15 that is held by the clamp 14. A linear actuator 11 is disposed between the clamp 14 and the force sensor 12, for linearly moving the tool 15 and clamp 14. The linear actuator 11 in FIG. 1 moves the tool 15 into and out of engagement with the workpiece 28. The linear actuator 11 is configured for imposing a super imposed sinusoidal modulation on the cutting tool 15, for moving the cutting tool 15 relative to the work piece 28, and causing instantaneous and periodic engagement and separation between the cutting tool 15 and the workpiece 28.

A biasing member, such as spring 13 is provided for exerting a force against the clamping member 14 to bias the clamping member 14 to move in an axial, linear direction opposite to the axial linear direction in which the linear transducer 11 moves the clamp 14. Typically, the linear transducer 11 is designed to move the clamp in a single direction, that, in the drawing would be right to left, to cause the tool to move forwardly toward the workpiece 28 to engage the workpiece 28.

The driving voltage is applied to the linear actuator, to cause the linear actuator to move in this direction. When the driving voltage is removed, the spring 13 can act against the clamp 14 to move the clamp 14 and linear actuator 11 in a reverse direction away from the workpiece 28 to cause the tool 15 to disengage from the workpiece 28. The spring 13 includes a first end 30 that has a spring seat that seats the first end 30 against the stationary member 31. The second end 32 of the spring 13 uses the clamp 14 as its spring seat. In the drawings, the spring seat of the clamp 14 is shown as a radially extending flange having an axially outwardly facing surface that serves as the spring seat.

A tool holder controller 16 is provided, that is in communication with each of the linear actuator 11, and the force sensor 12. The force sensor 12 is used to measure the axial force, $F_a$ that is exerted on the linear actuator 11. From this measured axial force, the tool holder controller 16 or the machine controller 17 can process the signal to determine the machine's thrusting force according to the equation $F_? = F_a - (K_?)(\Delta_x)$. In the above equation, $F_?$ equals the machine thrusting force; $F_a$ equals the axial force exerted on the linear actuator; $\Delta_x$ equals the linear displacement of the clamp; and $K_?$ equals a spring constant that relates to the stiffness of the spring.

The force signal that is received and processed by the tool holder controller 16 is used by the tool holder controller 16 to apply an appropriate drive voltage to the linear actuator 1 so that the linear actuator moves with the force ($F_?$), and over a distance ($\Delta_x$) that is appropriate for the work being performed on the workpiece.

The tool holder controller 16 is also in communication with the machine controller 17. As the machine controller 17 is in communication with the tool holder controller 16, the machine controller 17 is also in communication with the sensed force being communicated by the force sensor 12.

The machine controller 17 can take the force signal information (either processed or unprocessed), and process the information, to use the information so received and processed to better adapt the machine process parameters to the task at hand by adjusting the parameters to more appropriately serve the function that needs to be served to perform the particular machining operation on the particular workpiece 28. These machining processed parameters include such things as feed velocity, spindle rotation, etc.

One feature of the present invention is that the force signals that are provided to the tool holder controller 16 and/or machine controller 17, are provided in real time so that the tool holder controller 16 can process the information to adjust the driving voltage in real time, so that the movement of the linear actuator 11 can be controlled more accurately and more precisely, to achieve better machining results. This real time information that is provided to the tool holder controller 16 gives the tool holder controller the ability to adjust the driving voltage to the linear actuator in response of the received force information.

As stated above, the information that is received from the force signal can be processed by one or both of the tool holder controller 16 and machine controller 17. Although the tool holder controller 16 and machine controller 17 are shown as separate entities, it will be appreciated that they could be combined into a single controller.

As shown in FIG. 1, the tool holder 15, clamp 13, linear actuator 11 and force sensor 12 can all be designed to share a common axis. By sharing a common axis. each of the components 15, 13, 11, 12 can be designed to rotate with each other, or move each other as appropriate, in an efficient manner. The linear actuator 11 preferably includes one of a piezo-actuator, linear motor and magnetostrive actuator that are coupled to the integrated tool holder 10.

The integrated tool holder 10 and linear actuator 11 are capable of generating an axial tool 15 displacement from approximately 0.001 mm to about 0.5 mm in a preferred embodiment. Additionally, the linear actuator 11 and force sensor 12 are capable of measuring the thrust force during the machining process.

Linear actuator 11 is a aligned axially to the force sensor, and is preloaded compressively against the clamp 14 by a spring 13. The linear actuator 11 can generate the displacement (A) of the clamp that is linearly dependant upon the applied driving voltage that is applied by the tool holder controller 16. The clamp 14 is provided for holding the tool 15 tightly, so that the tool 15 and clamp 14 can move together due to the linear motion of the linear actuator 11.

The force sensor 12 is used to measure the axial force exerted on the linear actuator ($F_a$). The axial force ($F_a$) is used to obtain the machine thrusting force ($F_?$). The machine thrusting force is determined by using the equation set forth above.

The force induced charges to the force sensor 12 and the tool holder 10 are converted to the voltage signal through a charge amplifier. The force sensor information is fed back to the tool holder controller 16 for real time monitoring.

The tool holder controller 16 can activate the tool displacement and adjust process parameters, such as feed velocity, spindle rotation, etc., based on the force feedback signal. The force monitoring and feed back control of the machining process enables tool breakage to be detected and prevented. Additionally, self-adaptive processed parameter optimization can be performed by using the force feedback information and machine process can be enhanced.

D. Forced Air Cooling Aspect of the Present Invention

Figure 2:
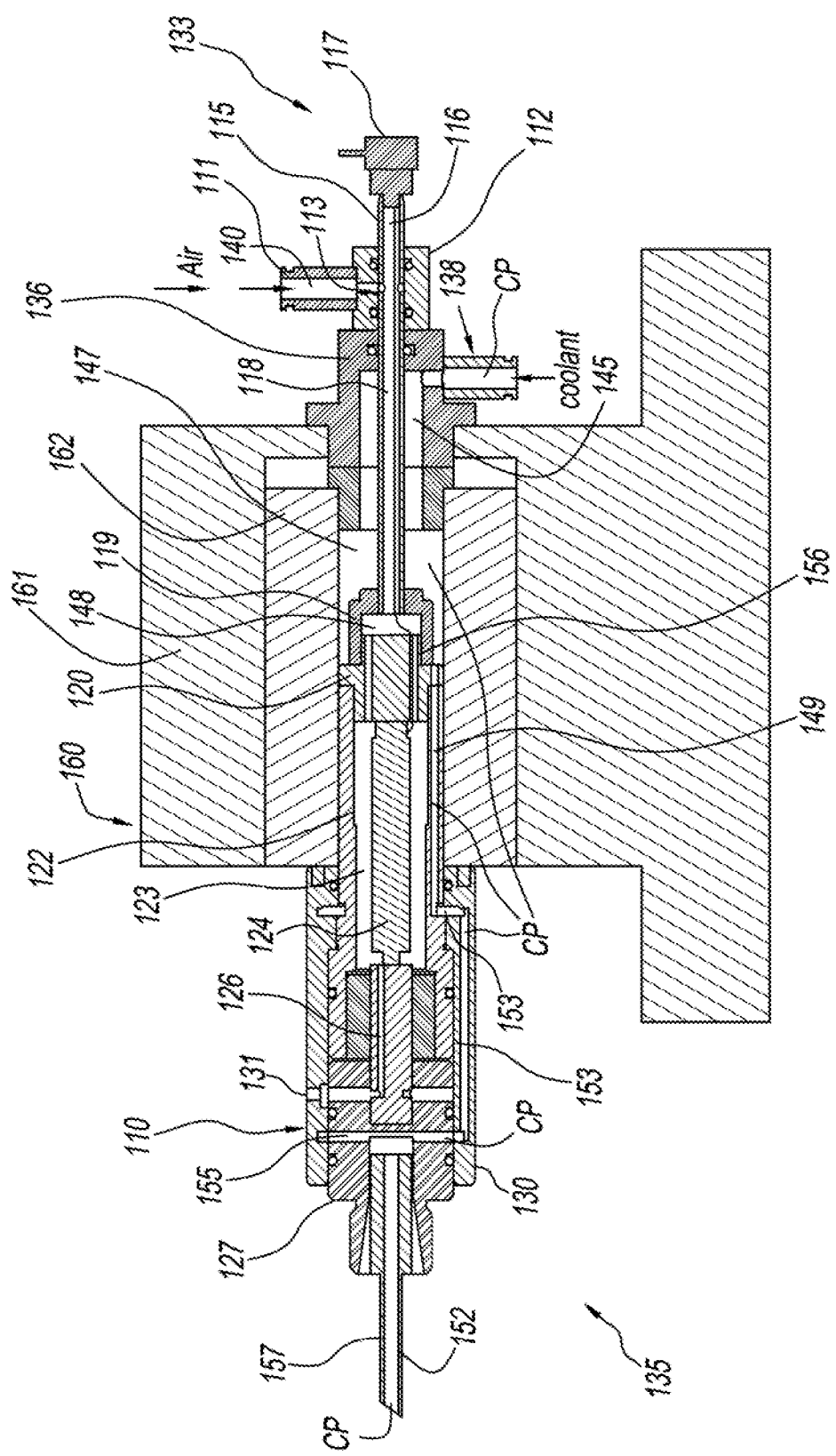
FIG. 2 is a sectional view showing the tool holder of the present invention including a forced air cooling air apparatus of the present invention.
Figure 3:
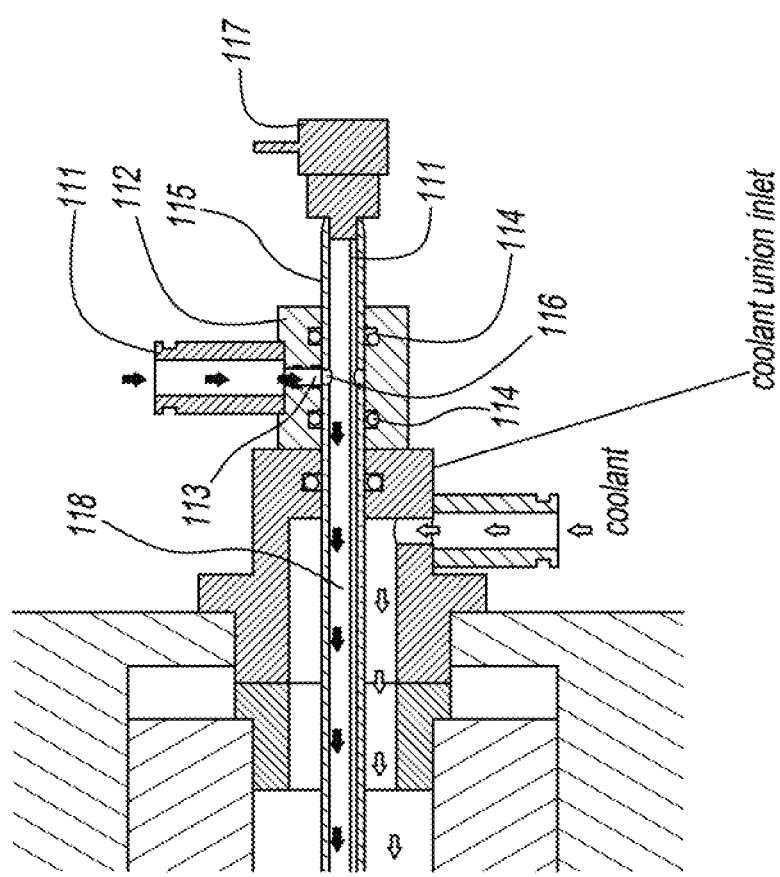
FIG. 3 is a sectional view, illustrating the machine engaging end of the tool holder of the present invention including the forced air cooling apparatus.
Figure 4:
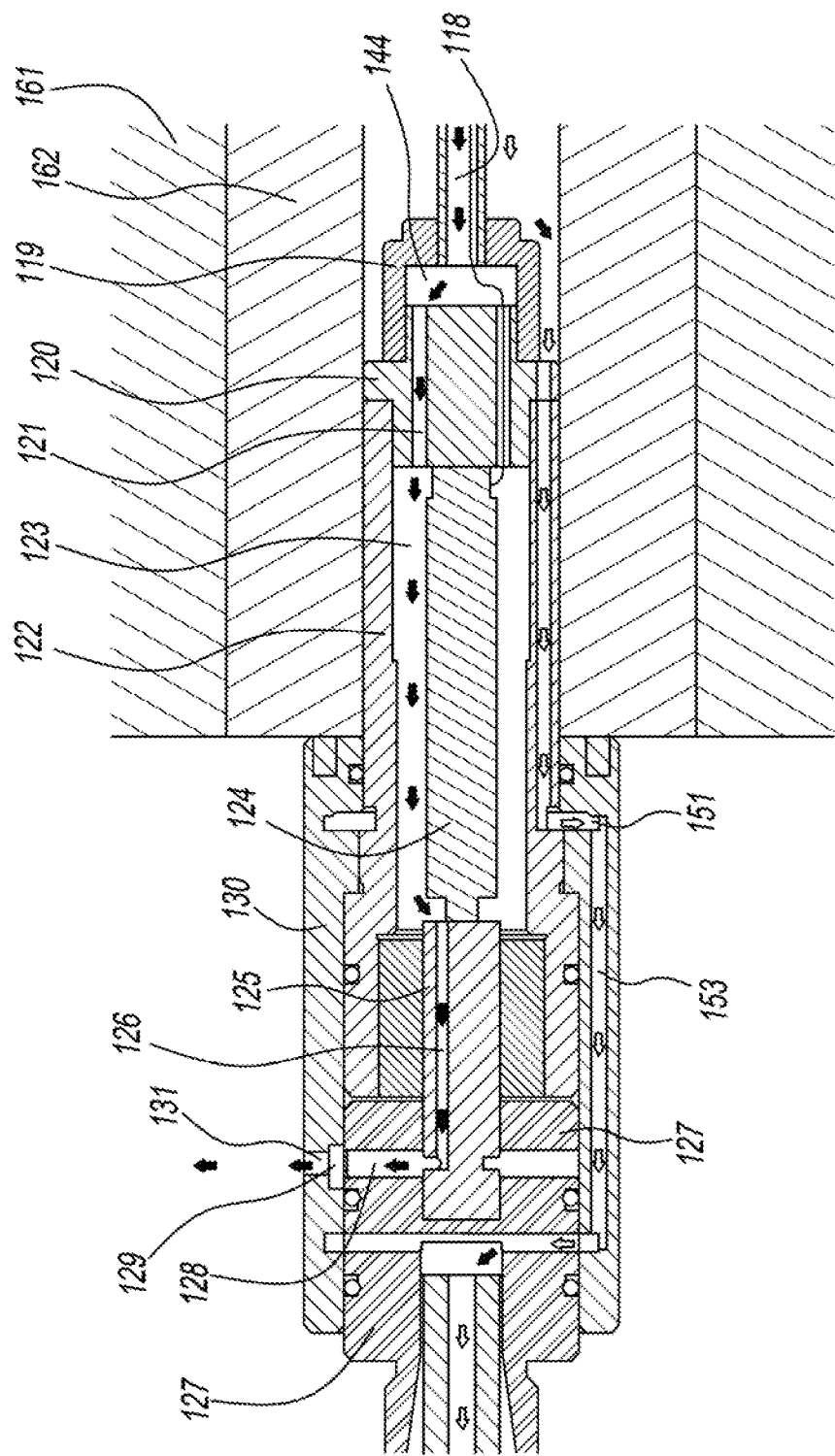
FIG. 4 is a sectional view of the workpiece engaging end of the tool holder of the present invention.

Turning now to FIGS. 2-4, the forced air cooling aspect of the present invention will be described.

The tool holder assembly 110 is shown as being provided for holding one of a tool 152 or workpiece (see e.g. workpiece 28 at FIG. 1). The tool holder assembly is configured for mounting to a driving member of a machine device 161, here represented as machine body 161. A rotating spindle 162 is coupled to the machine device 161. The tool holder assembly 110 includes a first end 133 to which the tool holder assembly can be coupled to the machining device 161 and a second end 135 to which the tool holder assembly 110 can be coupled to one of the tool 152 and to workpiece 128. The tool holder assembly 110 comprises rotating spindle member 162, a coolant housing 136 having a cooling inlet 138 for receiving liquid coolant that flows into coolant path CP. An air housing that comprises an air tube fitting 111 has an air inlet 140 for receiving air from an air source (not shown).

The tool holder assembly 110 further includes a linear actuator 124, having a first end disposed adjacent to tail cap 120, and a second end disposed adjacent to bearing shaft 125.

A linear actuator holder, that includes a tail cap 120 and an adaptor 119 is provided for holding the first end of the linear actuator 124. A tool holder 127 is provided for holding the one of the tool 152 and workpiece (not shown). In the drawings, the tool holder 127 is shown as holding onto the tool 152. The tool holder 127 can comprise a clamp that is provided for tightly engaging the tool 152 when necessary, but removably attaching the tool 152 so that the tool can be replaced on a regular basis when either a different tool is needed, or the tool being used becomes worn out. The tool holder 127 is disposed adjacent to the second end 15 of the tool holder assembly 110. A bearing shaft member 125 is disposed between the second end of the linear actuator 111 and the tool holder 127. The tool 152 includes a hollow interior 157 through which liquid coolant can flow.

A coolant passage CP is provided for conducting coolant within the tool holder assembly 110 from the coolant inlet 138, past the linear actuator holder 119, 120, the linear actuator 124, the bearing shaft member 125 and the tool holder 127 to deliver coolant to the interior passageway 157 of the tool 152. Coolant in the coolant pathway flows through the coolant inlet into an axially extending passageway 145 that is disposed within the interior of the coolant housing 136. The coolant in the coolant passageway CP then flows into a cavity 147, that is formed between the second end of the coolant housing 136 and the upstream end of the adaptor member 119.

The adapter 119 includes an outer diameter that is smaller than the inner diameter of the cavity 147, to allow the coolant in the coolant passageway CP to flow along side the adaptor member 119, and into an axially extending passageway 149 that is formed in a tool holder body 122.

Passageway 149 terminates in a radially extending passageway 151, that leads into an axially extending passageway 153, that is formed in the sleeve 130. Axially extending passageway 153 terminates in a radially extending passageway 155 that is formed as a part of the tool holder 127. The radially extending passageway 155 directs the coolant ultimately into an interior passageway 157 that extends axially through the interior of tool 152.

An air passageway is also provided for conducting the air within the tool holder assembly 110 from the air housing inlet 140, and past the linear actuator holder comprising the adaptor 119 and tail cap 120, past the linear actuator 124, through the bearing assembly 125, and radially outwardly through a radially extending passageway 148 that is formed within the tool holder that terminates in inlet 131 that is formed in sleeve 130, so that air within the air passageway, as shown in the black arrows of FIG. 4, can be exhausted to the space outside of the tool holder assembly. This exterior space may comprise either open atmosphere, or alternately, to some sort of tubing, vacuum or filter apparatus for withdrawing and/or retrieving the air.

The air passageway also includes a hollow interior passageway 118 of tubular member hem shown as electrical rod 115. The tubular electrical rod member 115 includes a first end that is coupled an electrical coupling, such as a snap fit coupling 117 that enables the source of electricity or electrical signals such as control signals to be coupled to the tubular member 115. The second end of the tubular member 115 is interiorly received within a passageway formed in an adaptor 119.

The air housing 114 includes the air inlet 140, along with an internal inlet passageway 113, that is in fluid communication with aperture formed in the side surface of the tubular member 115, so that air may pass from the air inlet 140 and inlet passageway 113, into the interior axially extending passageway 118 of the tubular member 115. As best shown in FIG. 3, the apertures within the tubular member 116 are formed within the tubular member 115, and are alignable within inlet aperture 113.

Continuing onward with FIG. 3, it also will be noted that the air housing includes an axially extending passageway for receiving tubing 115. A series of grooves are formed in the air housing, for receiving seals 114 for making the connection between the air housing 11 and tubular member 115 air tight, to prevent the leakage of air from the air housing, as the air passes between the inlet 113 and the interior passageway 118 of the tubular member.

An electrical connector 116 has a first end that is coupled to the electrical coupling 117 and a second end that is coupled to the linear actuator 124 for delivering electrical energy and/or electrical signals (such as control signals) from a controller (not shown) to the linear actuator 124 to cause the linear actuator to actuate and thereby cause linear movement. The electrical connector 116 is disposed within the interior passageway 118, and extends into the interior of the adaptor 119 and into an axial receiving passageway 126 that is formed in the tail cap 120. It will be noted that two or more such passageways 156 are provided in the tail cap, so that both the electrical conductor 116 and air can pass through the tail cap member.

The interior passageway 118 of the tubular member 115, a cavity disposed adjacent to the second end of the tubular member, and the axially extending passageway 156 of the tail cap member all comprise parts of the air passageway. It will be noted that the air passageway is distinct and separate from the cooling passageway CP, so that the air and coolant do not mix.

The air that emerges from the interior passageways 156 of the tail cap member enters into an axially extending cavity 123 that comprises a cylindrical space that is formed between the exterior surface of a linear actuator 124 and the radially inwardly facing surface of the tool holder body 122. This space 123 enables air to circulate along the linear actuator to thereby absorb heat from the linear actuator 124 to help keep the linear actuator 129 and the tool holder body 122 cool.

The air then flows from the space 123 toward the second end 15 of the tool holder assembly, by flowing through an axially extending passageway 126 that is formed in the bearing shaft 125. As best shown in FIG. 3, the axially extending passageway 126 of the bearing shaft 125 terminates in the radially extending outlet portion that leads into a radially extending exhaust port 128 that is formed in the tool holder 127. This exhaust port 128 is alignable with an annular groove 129 that is formed in the tool holder 127, and an exit aperture 131 that is disposed at the radially outwardly end of the annular groove 129.

The air that passes out of the exit aperture 131 is exhausted into a space exteriorly of the tool holder assembly. During its passage through the bearing assembly 125 and tool holder 127, the air can pick up heat from the bearing assembly 125 and tool holder 127, to thereby help to keep them more cool.

The tool holder bearing assembly and linear actuator 124 are interiorly received within an interior passageway of a sleeve 130, that extends between the spindle 162, and the tool holder 127. Additionally, a tool holder body 122 is also received within the hollow interior of the sleeve 130, and is provided for mounting and coupling the sleeve 130 to the rotating spindle 162, along with the components that are contained interiorly within the sleeve 130 and spindle 162.

Among the other components, it will be noted that the tail cap assembly 120 includes a first end which is interiorly received within an adaptor 119, and a second end that is interiorly received within the tool holder body 122. The adaptor 117 is coupled to the tail cap 120 and includes a female aperture for receiving the radially outer surface of the tubular member 115.

The tool holder assembly 110 of the present invention is designed for use with actuators, such as piezo-electro actuators or linear motors, such as those described in the Mann Patents and patent applications disclosed above. The linear actuator 124 enables the tool 152 to move in a cyclic-linear manner. Such linear actuation requires electrical power and/or control signals be supplied to the linear actuator 124 simultaneously with the rotational action of the tool 152 and linear actuator 124 to enable the tool 152 both to rotate and to move linearly.

The tool holder assembly 110 of the present invention is analogous to that disclosed in U.S. patent application Ser. No. 14/072,700, as both incorporate devices that enable power and fluid to be transferred from the back end (first end) of the tool holder assembly 110 and tool 152 to the front (distal) end of the tool 152 which is the portion of the tool that engages the workpiece. This is accomplished through a series of passageways CP that are formed on the component of the tool holder assembly and between components of the tool holder assembly as described above in more detail.

As the machining process evolves to higher rotational speed and feed rates, the power consumption increases and the corresponding capacity of the piezo electric linear actuator 124 increases. A supply of compressed air into the tool holder assembly 110, via the air housing 111 can provide active cooling to all components in thermal contact with the air passageway. In particular, active cooling can be provided to the piezo electric actuator 124, that has a tendency to heat up.

In order to accomplish this, air passageways, such as the air passageways of the present invention must be formed inside the rotational member, in addition to the previously presented features of the liquid cooling coolant passageway CP. In the present invention, each of compressed air for coolant, liquid for coolant, and electrical power am transferred through rotating components of the tool holder assembly, to enable the tool holder assembly 110 to accomplish its function of providing both rotational movement to the tool 152 and linear movement to the tool 152, while providing the necessary cooling and electrical power to the system.

The tool holder assembly 110 of the present invention may be employed within a machine designed to employ the modulated assisted machine described in this and the other Mann patents and applications. The tool holder assembly 110 is designed to be adapted to, and integrated into a rotating spindle 162 of a machine body 161 as shown in FIGS. 2-4.

In FIGS. 2 and 3, the black arrows shown represent the direction of air flow in the air passageway, as it follows its path from the air coolant inlet 111 to the exit port 131. The air that is delivered into the air inlet 118 preferably comes from an exterior source that most preferably comprises a compressed air source, so that a large volume of compressed air may be fed to the tool holder 110 interior and the air passageway, to help promote cooling by providing additional, lower temperature molecules of air that are capable of absorbing heat from the higher temperature component parts, such as the linear actuator 124. The white arrows shown in FIGS. 2 and 3 indicate the direction of high pressure coolant flow in the coolant passageway CP.

The air tube housing, also known as an air tube fitting 111 accommodates the inlet opening of the tool holder assembly 10. An air housing 112 is attached to the coolant housing 136 of the machine body 161.

The air inlet housing 111 includes an inlet hole 113 that is aligned with the air inlet 140 of the air inlet housing 111. The air housing 12 has multiple annular grooves in which a pair of air seals 114 are placed. The air seals 114 that are functionally similar to "O" rings, prevent air leakage out of an axial hole formed at the intersection of the air housing 112 and tubular member 115. Tubular member 115 is here shown as an electrical rod 115, primarily because of the fact that the tubular member 115 is provided for carrying and conveying an electrical conductor 116 that provides power to the linear actuator 124.

The electrical rod 115 is interiorly received by the radially extending passageway that is formed in the air housing 112, and a radially extending passageway that extends in the coolant housing 136.

An electrical coupler, such as a snap ring 117 is coupled to the first end of the tubular member 115, and the second end of the tubular member 115 is received by the first end of the adapter member 119. The snap ring 117 is used because it is rotationally coupled with respect to the rod member, and thereby permits an electrical connector that is not rotating to be coupled to a rotating member, such as the electrical rod 115.

The electrical rod 115 includes a plurality of apertures 116 that are aligned with inlet passageway 113 of the air housing 12 to form an air passageway so that air may flow between the inlet 140 and the interior passageway 118 of the tubular member 115. The electric rod tubular member 115 forms an axial passageway to accommodate the electrical conductor line 116, along with serving as a portion of the air passageway for conveying air axially through the tool holder assembly 110.

The adaptor 119 is connected to the second end of the electrical rod 115, and to a tail cap 120 of the tool holder assembly 110. A space 147 inside the adapter 119 forms a part of the air passageway. A tail cap 120 is assembled to a tool holder body 122 and also includes several axially extending passageways 156 so that air can flow inside the tool holder body 122 and can pass from the cavity 148 that is formed in the space between the adaptor 119 and the tail cap 120, and through the passageways 156 into the cavity 123 that exists between the linear actuator 124 and the tool holder body 122.

The piezo electric actuator 124 is assembled to the tail cap 120 and air passes through the space 123 between the tool holder 122 and the piezo electric actuator 124 to thereby actively cool the piezo electric linear actuator 124. After the air is used for cooling, the heated air exits through a axially extending passageway 126 that is formed in the bearing shaft 125. The bearing shaft 125 is assembled to the piezo electric linear actuator 124 and includes the axial passageway 126 for the passage of air flow there through. In the second (tool) end portion of the bearing shaft 125 a radially extending aperture 143 is formed that directs the air radially outwardly, and into the radially extending passageway 128 that is formed as a part of the tool holder 127.

The tool holder 127 is assembled at the end of the bearing shaft 125 and includes the radially extending passageway 128. The radially extending passageway 128 is aligned with the radially extending aperture 143 of the bearing shaft 125 to receive air that passes from the radially extending aperture.

The sleeve 130 houses the tool holder body 122 and tool holder 127, that are disposed interiorly of the sleeve. The sleeve 130 has an annular groove 129 and exit apertures 131 that are positioned to align with the radially extending passageway 128 of the tool holder 127. The air that is contained within the air passageway is exhausted from the tool holder assembly 110 by exiting through apertures 131.

The overall air passageway portions described above, route the air through internal clearances in the assembly, and dedicated passageways to enable convective cooling of the piezo electric actuator 124 of the tool holder assembly 110. The present invention accomplishes the air cooling for the tool holder assembly 110 with the addition of unique features.

Having described the invention in detail with reference to certain preferred embodiments, it will be appreciated that modifications exist within the scope and spirit of the present invention, and are limited only by the claims and their equivalence.

What is claimed is:

1. A tool holder for holding one of a tool and a workpiece, the tool holder being configured for mounting to a driving member of a machining device, the tool holder comprising:
   a tool holder first end including a coupler for coupling the tool holder to the driving member of the machining device;
   a tool holder second end including a clamp for releaseably holding one of the tool and workpiece;
   a force sensor disposed between the clamp and the coupler for sensing an axial force exerted on a linear actuator, wherein the linear actuator is located between the clamp and the force sensor for linearly moving the one of the tool and workpiece; and
   wherein the linear actuator is configured for imposing a superimposed sinusoidal modulation on the one of the tool and workpiece for moving the one of the tool and the workpiece relative to the other of the tool and the workpiece, thereby causing instantaneous and periodic engagement and separation between the tool and the workpiece.

2. The tool holder of claim 1, wherein the clamp is provided for holding the tool for permitting the tool to perform a machining operation on the workpiece, and wherein the linear actuator is configured for moving the tool into and out of engagement with the workpiece.

3. The tool holder of claim 1, wherein the tool is a cutting tool, and wherein the linear actuator is configured for imposing a superimposed sinusoidal modulation on the cutting tool for moving the cutting tool relative to the workpiece and causing instantaneous and periodic engagement and separation between the cutting tool and the workpiece.

4. The tool holder of claim 3, further comprising a controller in communication with the linear actuator for providing a controllable driving voltage for driving the linear actuator, and wherein the controller is in communication with the force sensor for receiving a force signal generated by the force sensor.

5. The tool holder of claim 4 wherein the controller comprises a tool holder controller for receiving the force signal generated by the force sensor, and providing a controlled driving voltage for the linear actuator, and a machine controller in communication with the tool holder controller, the machine controller being in communication with the driving member of the machining device, wherein the force signals provide real time force information to the tool holder controller to adjust the driving voltage to the linear actuator in response to the received force information.

6. The tool holder of claim 5, wherein the force sensor is in communication with the machine controller for providing real time force information to the machine controller for enabling the machine controller to adjust machine process parameters in response to the received force information.

7. The tool holder of claim 6 wherein the machine process parameters include at least one of driving voltage, feed velocity, and spindle rotation.

8. The tool holder of claim 1, wherein the linear actuator is configured for exerting the axial force against the tool to move the tool in a first axial direction, further comprising a biasing member for moving the tool in a second axial direction opposite to the first axial direction.

9. The tool holder of claim 8, wherein the clamp is provided for holding the tool for permitting the tool to perform a machining operation on the workpiece, and wherein the linear actuator is configured for moving the tool into and out of engagement with the workpiece, wherein the biasing member comprises a spring, wherein the clamp includes a spring seat for receiving a first end of the spring, and wherein the spring is biased to exert a force on the clamp to move the clamp in a direction to disengage the tool from the workpiece.

10. The tool holder of claim 8 wherein the tool, clamp, linear actuator and force sensor share a common axis.

11. The tool holder of claim 8 wherein the force sensor comprises a piezo resistive strain gauge.

12. The tool holder of claim 1 further comprising a controller in communication with the linear actuator for providing a controllable driving voltage for driving the linear actuator, the tool holder controller also being in communication with the force sensor for receiving a force signal generated by the force sensor, the controller being configured to process the signal to determine machine thrusting force.

13. The tool holder of claim 12 wherein the controller is configured to process the signal to determine machine thrusting force according to the equation $$F_?=F_a-(K_3)(\overline{A}_x)$$

wherein
$F_?$=Machining Thrust Force
$F_a$=the axial force exerted on the linear actuator
$\Delta_x$=the displacement of the clamp, and
$K_3$=a spring constant relating to the stiffness of a spring.

* * * * *